United States Patent
Knapp et al.

(10) Patent No.: US 10,343,326 B2
(45) Date of Patent: Jul. 9, 2019

(54) METHOD FOR TRANSFORMING PLASTIC PREFORMS

(71) Applicant: KRONES AG, Neutraubling (DE)

(72) Inventors: Peter Knapp, Schmatzhausen (DE); Andreas Steiner, Wenzenbach (DE); Jochen Hirdina, Regensburg (DE); Klaus-Peter Fleischer, Regensburg (DE)

(73) Assignee: KRONES AG (DE)

( * ) Notice: Subject to any disclaimer, the term of this patent is extended or adjusted under 35 U.S.C. 154(b) by 702 days.

(21) Appl. No.: 14/974,924

(22) Filed: Dec. 18, 2015

(65) Prior Publication Data

US 2016/0176099 A1 Jun. 23, 2016

(30) Foreign Application Priority Data

Dec. 23, 2014 (DE) ........................ 10 2014 119 563

(51) Int. Cl.
  *B29C 49/78* (2006.01)
  *B29C 49/12* (2006.01)
  (Continued)

(52) U.S. Cl.
  CPC .............. *B29C 49/78* (2013.01); *B29C 49/12* (2013.01); *B29C 49/18* (2013.01); *B29C 49/06* (2013.01);
  (Continued)

(58) Field of Classification Search
  CPC ..................................................... B29C 49/78
  See application file for complete search history.

(56) References Cited

U.S. PATENT DOCUMENTS 6,576,171 B1  6/2003  Devenoges ................. 264/40.1
9,102,090 B2  8/2015  Haesendonckx et al. ...................
                                                        B29C 49/78
(Continued)

FOREIGN PATENT DOCUMENTS

CN     102112292   6/2011    ............. B29C 49/12
DE       1016665  10/1957    ............. E21D 15/28
(Continued)

OTHER PUBLICATIONS

German Search Report issued in application No. 10 2014 119 563.9, dated Jan. 4, 2016 (8 pgs).
Extended European Search Report issued in application 15202544.1, dated Apr. 28, 2016 (5 pgs).
Chinese Office Action (w/translation) issued in application No. 201510967605.2, dated Jun. 1, 2017 (12 pgs).

*Primary Examiner* — Larry W Thrower
(74) *Attorney, Agent, or Firm* — Hayes Soloway P.C.

(57) ABSTRACT

A method for transforming plastic preforms into plastic bottles, in which preforms are introduced into blowing stations, each blowing station having at least one blow mold and a stretching rod for stretching the preform along a longitudinal axis of the preform within the blow mold, and the preforms are expanded to form the plastic bottles by being acted upon by a gaseous medium in the blow mold, wherein a wall thickness of the plastic container is measured by at least one measuring device which outputs the measured values to a closed-loop and/or open-loop control device, wherein at least a stretching speed of the stretching rod is varied by the closed-loop and/or open-loop control device at least at times and/or at least in some locations during the blowing operation, individually for each blowing station, in order to adjust a wall thickness of the plastic bottles.

12 Claims, 2 Drawing Sheets

(51) Int. Cl.
*B29C 49/18* (2006.01)
*B29L 31/00* (2006.01)
*B29C 49/06* (2006.01)
*B29C 49/64* (2006.01)
*B29K 105/00* (2006.01)

(52) U.S. Cl.
CPC ............ *B29C 49/64* (2013.01); *B29C 49/783* (2013.01); *B29C 2949/78092* (2013.01); *B29C 2949/78369* (2013.01); *B29C 2949/78571* (2013.01); *B29C 2949/78882* (2013.01); *B29K 2105/258* (2013.01); *B29L 2031/7158* (2013.01)

(56) References Cited

U.S. PATENT DOCUMENTS

| | | | |
|---|---|---|---|
| 2009/0108505 A1 | 4/2009 | Steiner | 264/535 |
| 2011/0044755 A1 | 2/2011 | Alguera Gallego et al. | 403/404 |
| 2011/0175246 A1* | 7/2011 | Winzinger | B29C 49/78 264/40.1 |
| 2011/0206882 A1 | 8/2011 | Broyles | 428/36.92 |

FOREIGN PATENT DOCUMENTS

| | | | | |
|---|---|---|---|---|
| DE | 10116665 | 10/2002 | ............ | B29C 49/78 |
| DE | 102008034934 | 4/2009 | ............ | B29C 49/78 |
| DE | 102008038782 | 2/2010 | ............ | B29C 49/64 |
| DE | 102009040803 | 4/2011 | ............ | B29C 49/42 |
| EP | 2247492 | 11/2010 | ............ | B62D 29/00 |
| WO | WO2009092756 | 7/2009 | ............ | B62D 29/00 |

* cited by examiner

METHOD FOR TRANSFORMING PLASTIC PREFORMS

BACKGROUND OF THE INVENTION

The present invention relates to a method for transforming plastic preforms into plastic bottles and to an apparatus for transforming plastic preforms into plastic bottles.

The starting point here is a method for transforming plastic preforms into plastic bottles, wherein the plastic preforms are introduced into blowing stations, wherein each blowing station comprises at least one blow mould and a stretching rod for stretching the plastic preform along a longitudinal axis of the plastic preform within the blow mould, and the plastic preforms are expanded to form the plastic bottles by being acted upon by a gaseous medium in the blow mould.

Such methods are already well known from the prior art and can be subsumed under the conventional blow-moulding processes for producing plastic bottles.

However, the inventors have recognized the need that often very particular individual material requirements are placed on plastic bottles and/or haptically perceptible requirements are placed on the individual shape of the respective plastic bottles.

In terms of requirements on the customer side, this often concerns not only, for example, a size or shape of the respective plastic bottles, but alternatively or additionally a wall thickness distribution in a longitudinal direction of the respective plastic bottles is also critical in order, on the one hand, to be able to ensure in a particularly simple manner a stability of the plastic bottle, particularly in the filled state thereof, and on the other hand to be able to adjust the weight of the plastic bottle while at the same time having mechanically stable properties.

According to knowledge available hitherto from the prior art, a wall thickness distribution in stretch-blow-moulded containers can be adjusted by a complicated interplay of a plurality of process-related influencing variables, such as pre-blowing timing, pre-blowing pressure and pre-blowing flow rate and also the heat settings in the different heating zones during the production process.

By way of example, the applicant's document DE 101 16 665 A1 discloses a method for controlling a blowing operation during the production of containers, in which a wall thickness of a container is detected immediately after production thereof and is compared with a target value of this at least one detected property, and a temperature profile generated for heating of the preforms and/or at least one blowing parameter is varied as a function of the magnitude of the comparison result in the direction of lowering this magnitude. Therefore, "wall thickness distribution" denotes the progression of a wall thickness of the plastic bottles along the longitudinal direction of the plastic bottle.

In other words, said document discloses adjusting a wall thickness distribution of the container only after the actual production of the container, and is moreover linked in particular to the heating process. During the blowing process, therefore, no adjustment of the wall thickness, i.e. adjustment of a wall thickness distribution, can take place according to said document.

In contrast, document EP 2 247 492 B1 discloses a stretch-blow-moulding method in which a wall thickness distribution can be monitored during the blowing operation within the blow mould, but said document merely shows the person skilled in the art that a wall thickness distribution can be adjusted by means of a plurality of different control parameters, such as, for example, the preform temperature, the temperature distribution in the preform, the blowing pressure curve, stretching curve, material properties, etc., wherein said document does not indicate a possibility of influencing individual blowing stations individually in respect of the wall thickness distribution of individual finished bottles.

The inventors have now recognized that controlling the plurality of complex interactions between the individual control variables is very susceptible to faults during the blowing operation and moreover requires a technically complex and cost-intensive blowing apparatus.

SUMMARY OF THE INVENTION

It is therefore an object of the present invention to overcome the abovementioned disadvantages and thus to specify a method for transforming plastic preforms into plastic bottles in which a wall thickness distribution of the plastic preforms and/or of the plastic bottles can be adjusted particularly easily and individually during the blowing operation and at the same time a minimum number of control variables is used so as to provide a method which serves in a particularly simple manner to carry out the production of mechanically stable and inexpensive containers.

In order to specify such a method, the present invention makes use, inter alia, of the idea that a wall thickness of the plastic container is measured by means of at least one measuring device, for example during the blowing operation, and the measuring device outputs the measured values to a closed-loop and/or open-loop control device, wherein at least a stretching speed of the stretching rod is varied by the closed-loop and/or open-loop control device at least at times and/or at least in some locations during the blowing operation, individually for each blowing station, in order to adjust a wall thickness of the plastic bottles.

In particular, therefore, the method proposed here can be a method which comprises a closed control loop, within which the measuring device and the closed-loop and/or open-loop control device are a fixedly integrated component.

The measuring device can measure wall thicknesses and/or wall thickness distributions along the longitudinal direction of the plastic preforms, for example in a temporally continuous manner, and can output these measured values either in the form of data packets in a temporally discontinuous manner, or in a temporally continuous manner, that is to say in the form of individual data items, to the closed-loop and/or open-loop control device.

Since, unlike in the cited prior art, the closed-loop and/or open-loop control device uses, instead of a plurality of different control variables, the stretching speed described here of the stretching rod as a control variable, the closed control loop can therefore also be configured in a particularly simple and durable manner. Specifically, there is advantageously no need for coordination of individual sub-control loops, which are of course communicatively connected to one another according to the earlier prior art. In particular, therefore, the stretching speed can be Used as the sole control variable and the method described here can make do with a single closed control loop, within which the measuring device and the closed-loop and/or open-loop control device are implemented.

The measurement of the wall thickness distribution takes place preferably after the blowing operation and particularly preferably along the entire longitudinal profile of the finishblown bottle. In particular, it is conceivable that a wall thickness distribution is adjusted and/or can be adjusted during a pre-blowing phase, and preferably only during this phase. For measuring the wall thickness distribution, however, it would also be conceivable to arrange the measuring device or measuring sensors either already within the blow mould and/or on the stretching rod, so that these thickness sensors can determine the respective wall thickness of the preform as a function of the respective position of the measuring sensors along the longitudinal direction of the plastic preforms.

Control can then be implemented in particular in that the measured wall thicknesses are forwarded by the measuring device to the closed-loop and/or open-loop control device and these wall thickness measured values thus measured are compared by the closed-loop and/or open-loop control device with target values stored in the closed-loop and/or open-loop control device and, based on any deviation between the target values and the actual values, the parameters influencing the blow-moulding operation, that is to say including the stretching speed of the stretching rod, are varied in such a way that any remaining deviation is minimized. Such a control loop can therefore be implemented in the form of an online control loop.

An online control loop therefore comprises at least one online measurement of a bottle quality criterion (for example a wall thickness distribution) during the production process (that is to say during the line run-through phase), without removing the bottles from the bottling line (the processing process: manufacturing, filling, . . . , palletizing) or without removing them for a long period of time.

Specifically, it has been recognized that—if the stretching is slowed during the process—this results in an accumulation of material at the associated height position of the plastic preform, at which the bubble simultaneously forms. If the stretching process were instead to be accelerated, this would result in a correspondingly thinner site at the associated location. This effect can be used according to the invention to influence the wall thickness distribution in particular during the pre-blowing phase. By virtue of the described measurement by means of the measuring device described here, this effect can be used to generate the closed control loop described above for controlling the wall thicknesses using just one control variable. This generating of the wall thickness using just one control variable, that is to say the speed of the stretching rod, can therefore be carried out in particular in a particularly easy manner during the pre-blowing and/or during the intermediate blowing.

According to at least one embodiment, in the method claimed here for transforming plastic preforms into plastic bottles, firstly plastic preforms are introduced into blowing stations, wherein each blowing station comprises at least one blow mould and a stretching rod for stretching the plastic preform along a longitudinal axis of the plastic preform within the blow mould, and the plastic preforms are expanded to form the plastic bottles by being acted upon by a gaseous medium in the blow mould.

According to the invention, a wall thickness of the plastic container is measured by means of at least one measuring device, wherein the measuring device outputs the measured values to a closed-loop and/or open-loop control device, wherein at least a stretching speed of the stretching rod is varied by the closed-loop and/or open-loop control device at least at times and/or at least in some locations during the blowing operation, individually for each blowing station, in order to adjust a wall thickness of the plastic bottles.

According to at least one embodiment, the stretching speed is the sole control variable by means of which the wall thickness of the plastic bottles is adjusted via the closed-loop and/or open-loop control device, in particular during the blowing operation. Specifically, the inventors have surprisingly recognized that it is absolutely sufficient to implement only the stretching speed as a control variable, whereas, according to the teaching of the prior art, a wall thickness distribution of stretch-blow-moulded containers is influenced only by a plurality of process-related influencing variables, such as pre-blowing timing, pre-blowing pressure and pre-blowing flow rate, as well as the heat settings in the different heating zones. In actual fact, however, the inventors were able to ascertain that the stretching speed as the sole control variable is entirely sufficient to be able to adapt and adjust a wall thickness distribution in particular individually for each blowing station.

According to at least one embodiment, the blowing operation comprises a first step, during which a pre-blowing is carried out by acting upon the plastic preforms with a first pressure, a second step, during which an intermediate blowing of the plastic preforms is carried out with a second pressure which is higher than the first pressure, and finally a third step which is characterized by a finish-blowing of the plastic preforms with a third pressure which is higher than the first two pressures. In this case, the stretching speed of the stretching rod is varied at least during the pre-blowing and/or during the intermediate blowing. By way of example, the stretching speed of the stretching rod is varied at least during the pre-blowing and/or during the intermediate blowing and/or the stretching speed of the stretching rod is varied at an instant p0.

It has been recognized that the individual pressure levels during the various blowing phases are also a critical criterion for forming a predefinable wall thickness distribution. In particular, it is conceivable that, besides adjusting the stretching speed of the stretching rod, moreover also the individual pressures during the individual blowing phases can be controlled by means of the closed-loop and/or open-loop control device described here. Preferably, such a control is then an automatic control, so that the individual pressures can in practice transiently oscillate. Specifically, it is also conceivable that the individual pressures are made dependent on the respective stretching speed, or conversely the stretching speed is made dependent on individual pressures.

After the finish-blowing, the pressure level is preferably lowered at least partially back to an intermediate blowing pressure. Advantageously, the pre-blowing pressure is between at least 2 bar and at most 15 bar, preferably between at least 4 bar and at most 12 bar, and particularly preferably between at least 4 bar and at most 10 bar. Advantageously, the intermediate blowing pressure is between at least 8 bar and at most 40 bar, preferably between at least 12 bar and at most 20 bar. Advantageously, the finish-blowing pressure is between at least 22 bar and at most 40 bar and preferably between at least 20 bar and at most 35 bar.

According to at least one embodiment, at least during the pre-blowing and/or during the intermediate blowing, the stretching speed is varied in such a way that, apart from speed changeover time intervals, the stretching speed is in each case constant.

"Speed changeover time intervals" will be understood to mean those time intervals during the blowing operation during which the stretching speed is being changed over between the individual displacement speeds by means of a drive device.

However, the changeover instants may also be selected in such a way that the stretching speed is continuously being accelerated and/or slowed and accordingly is never constant. One speed changeover time interval would therefore follow the next, preferably directly and/or without delay.

According to at least one embodiment, during the finish-blowing, the stretching rod is at a standstill inside the blow mould or at least is slowed in terms of its speed. If the stretching rod is at a standstill during the finish-blowing, a wall thickness distribution is controlled not via a movement of the stretching rod but via other control variables, in particular via the blowing pressure and/or the blowing temperature itself.

According to at least one embodiment, the stretching speed of the stretching rod is slowed at the instant p0. This may mean, in particular, that the speed is continuously or suddenly slowed just prior to the instant at which the stretching rod strikes the preform bottom, that is to say at the instant p0. By slowing the stretching speed, the moment of contact is varied and thus the respective position of the preform tip at the time of making contact with the stretching rod is varied. Due to the centrifugal forces occurring during transfer, the preform undergoes a certain pendular movement within the blow mould, in particular before the stretching rod reaches the p0 point. This pendular movement may cause an incorrect positioning of the injection point, a so-called off-centre. This problem can be reduced by slowing the stretching speed at the instant p0. The stretching rod then still swings but it strikes the preform earlier and is thus "caught" in terms of its movement.

According to at least one embodiment, during the speed changeover time intervals, the stretching speed changes linearly as a function of the blowing time. To this end, the method can be operated by means of such a drive device which makes it possible that the respective displacement speed does not vary uncontrollably back and forth during the changeover but rather instead is increased, raised or lowered in a predefinable manner along a linear course.

According to at least one embodiment, each blowing station comprises at least one drive unit, in particular a servo motor, which is controlled individually by the closed-loop and/or open-loop control device in such a way that the stretching speed of the stretching rod is varied. In particular, the servo motor described here may be a motor in the form of a linear motor. It has been recognized that a linear motor can be moved particularly easily by means of the closed-loop and/or open-loop control device.

According to at least one embodiment, the finish-blowing of the plastic bottles is started in a time-controlled manner, that is to say a changeover to the finish-blowing pressure takes place just before the maximum intermediate blowing pressure is reached. This ensures that the finish-blowing is started only once the wall thickness distribution has been sufficiently adjusted during the intermediate blowing, in particular at the end of the intermediate blowing pressure time interval. It would also be conceivable to change over to the finish-blowing pressure only when the intermediate blowing pressure exceeds a predefinable limit value.

According to at least one embodiment, the blow moulds are transported along a predefined transport path during the expansion of the plastic preforms, wherein the stretching speed is also selected as a function of a position of the blow mould along this transport path.

For example, it is possible that a changeover from the pre-blowing pressure to the intermediate blowing pressure or from the intermediate blowing pressure to the finish-blowing pressure or vice versa takes place in any event from a given position of the blowing stations on their transport path.

Advantageously, the blow moulds or the blowing stations, of which the blow moulds are preferably also a component, are transported along a circular transport path, for example by means of a blowing wheel. In this case, a checking of the respective angle at which the method steps in question are started preferably takes place.

For example, it is possible that the time period or the angle during which a variation of the stretching speed of the stretching rod takes place is not further increased if a predefinable wall thickness distribution has already been achieved.

The present invention also relates to an apparatus for transforming plastic preforms into plastic bottles. In particular, a method according to at least one of the embodiments discussed above can be carried out by means of the apparatus described here, that is to say that all the features disclosed for the method described here are also disclosed for the apparatus that is also described here, and vice versa.

According to at least one embodiment, the apparatus for transforming plastic preforms into plastic bottles comprises at least two blowing stations, wherein the plastic preforms can be introduced into blowing stations, wherein each blowing station comprises at least one blow mould and a stretching rod for stretching the plastic preform along a longitudinal axis of the plastic preform within the blow mould, and the plastic preforms can be expanded to form the plastic bottles by being acted upon by a gaseous medium in the blow mould.

According to the invention, a wall thickness of the plastic container can be measured by means of at least one measuring device, for example during the blowing operation, wherein the measuring device outputs the measured values to a closed-loop and/or open-loop control device, and wherein at least a stretching speed of the stretching rod is varied by the closed-loop and/or open-loop control device at least at times and/or at least in some locations during the blowing operation, individually for each blowing station, in order to adjust a wall thickness of the plastic bottles.

The apparatus described here has the same advantageous embodiments and advantages as the method described here.

BRIEF DESCRIPTION OF THE DRAWINGS

The method described here and the apparatus described here will be explained in greater detail below on the basis of an example of embodiment and the associated figures.

In the examples of embodiments and in the figures, components which are identical or which act in an equivalent manner are in each case provided with the same reference signs. The elements shown are not to be regarded as true-to-scale, but instead individual elements may be enlarged for the sake of better understanding.

DETAILED DESCRIPTION OF THE INVENTION

Figure 1:
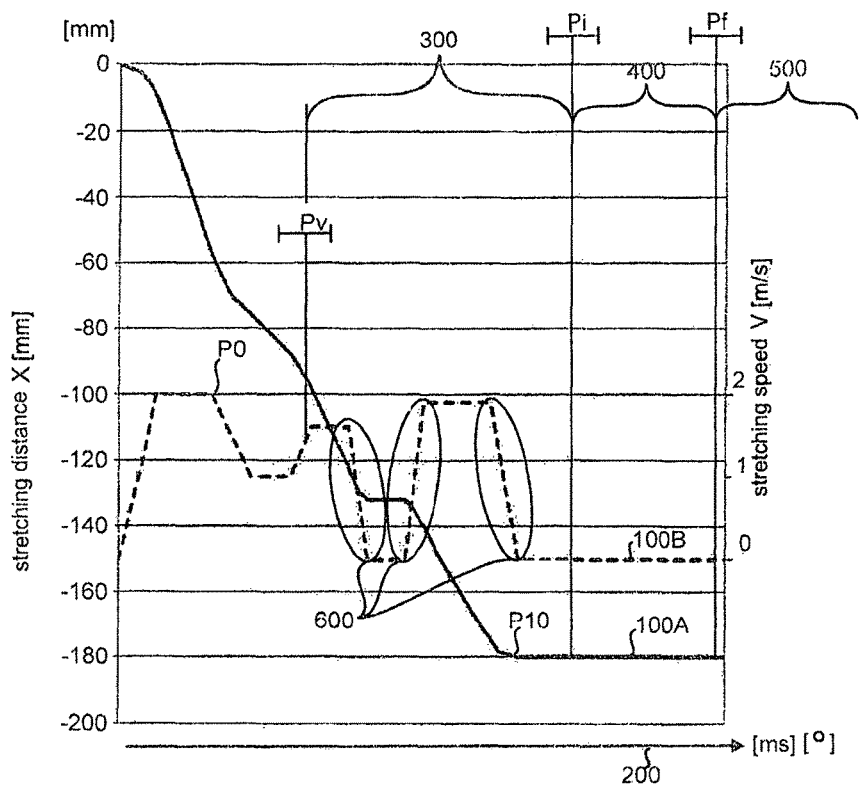
FIG. 1 shows a graph in which a stretching distance of a stretching rod during blowing is plotted as a function of a blowing time and a stretching speed of the stretching rod is also plotted as a function of the blowing time.

FIG. 1 shows a schematic diagram in which a stretching distance X is plotted against a blowing time 200 in a Cartesian coordinate system. In other words, the stretching distance X forms the vertical ordinate axis and the blowing time 200 forms an abscissa axis. As an alternative to the blowing time 200 plotted on the abscissa axis, a transport angle of a plastic preform may also be used.

On a further ordinate axis, located opposite the stretching distance X, a stretching speed V is also plotted against the blowing time 200.

There is thus shown in the diagram of FIG. 1 a first curve 100A which is the curve of the stretching distance as a function of the blowing time and a second curve 100B which is a curve, over time, of the stretching speed V of a stretching rod 22 which stretches a plastic preform 10 within a blow mould 21.

Figure 2:
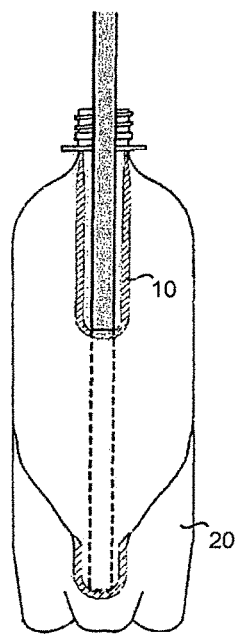
FIG. 2 shows an example of embodiment of a blowing process for shaping containers by means of a stretching rod.

As shown in FIG. 2, firstly a plastic preform 10 is stretched by means of the stretching rod 22 in the longitudinal direction L of the plastic preforms 10 to a final length. FIG. 2 and the stretching distance shown therein corresponds to the stretching distance shown in FIG. 1.

Also plotted graphically in the diagram of FIG. 1 are the individual instants pv, pi and pf, wherein the individual instants are marked in the context of specified intervals within which a pressure changeover can be selected. The instants and/or time intervals pv, pi and pf are therefore intended to indicate in which temporal context the individual pressures can be switched on. Usually, the time interval within which individual pressures can be switched on is a time interval of less than 2 seconds. Here, the instant p0 denotes the instant at which the stretching rod 22 strikes a preform bottom.

Pv therefore represents a time interval at which the pre-blowing phase 300 is started, wherein correspondingly pi represents a time interval at which the intermediate blowing phase 400 is started, and pf represents a time interval for starting the finish-blowing phase 500. As an alternative to this, however, it may also be the case that the individual instants mark not only the specific instant of starting of the individual blowing phases, but rather the time intervals represent the absolute duration of the blowing phase in question. Also additionally shown is an instant p10 which is reached when the stretching rod 22 brings the bottom of the plastic bottle 20 into the desired final position and the stretching rod 22 is therefore extended to its maximum.

In other words, therefore, the diagram of FIG. 1 shows a pre-blowing phase 300 and an intermediate blowing phase 400 which immediately follows the pre-blowing phase 300, and a finish-blowing phase 500 which immediate follows the intermediate blowing phase 400. It is also possible to see that the blowing operation and the stretching operation are temporally tailored to one another. The curve of the stretching distance X over time is significantly varied particularly in the pre-blowing phase 300, that is to say between the instants p0 and p10.

It can also be seen that, for example during the intermediate blowing phase 400, the stretching rod remains in its position, so that a stretching speed V is zero. In this range, however, the stretching speed V need not necessary be zero, but rather it may merely be slowed or even accelerated. This could just as well take place during the finish-blowing phase 500.

Figure 3:
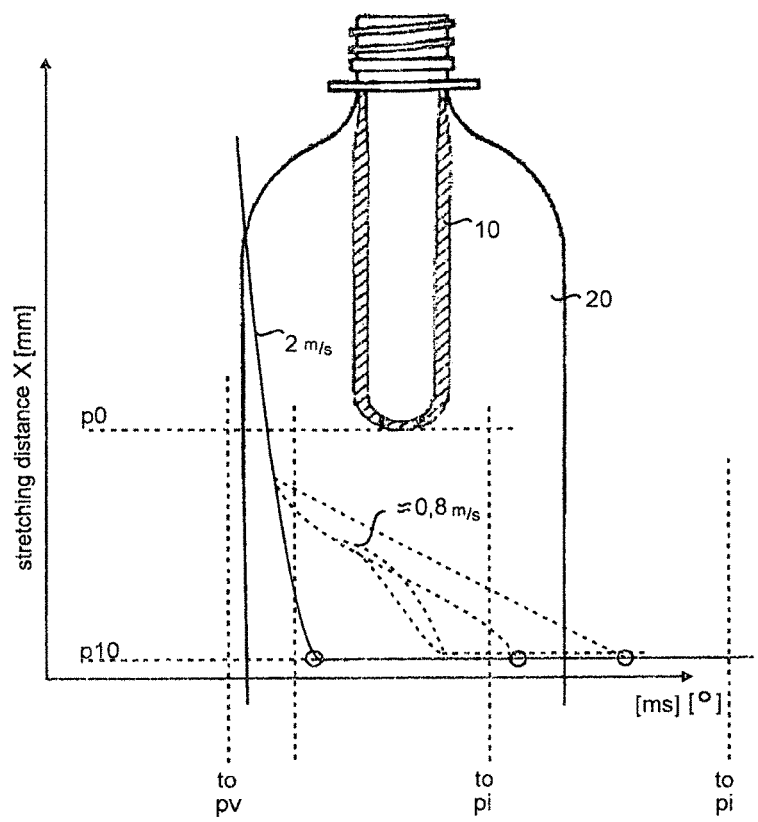
FIG. 3 shows, in a further graph, a stretching distance as a function of time for various stretching speeds and blowing pressures.

In contrast to FIG. 1, FIG. 3 again shows a schematic diagram of a stretching distance X plotted against a blowing time 200, but the stretching distance X is shown in graph form for different stretching rod speeds V of the stretching rod 22. In FIG. 2, therefore, there is no second ordinate axis, which was actually provided in FIG. 1 for showing the stretching rod speed V, and instead the respective corresponding stretching speed V is assigned in the graph to the individual stretching distances X and in particular the individual stretching distance segments.

Figure 4:
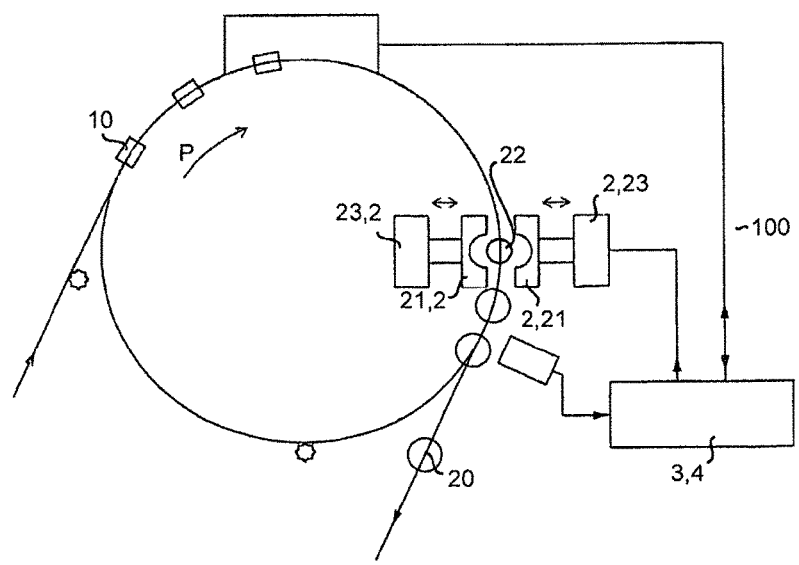
FIG. 4 shows, in a schematic plan view, an example of embodiment of an apparatus described here for transforming plastic preforms into plastic bottles.

FIG. 4 shows an apparatus 100 for transforming the plastic preforms into plastic bottles 20. In particular, the method sequences shown in FIGS. 1 and 2 can be achieved by means of the apparatus 100 described here. It can be seen that the apparatus 100 comprises a plurality of blowing stations 2, wherein the plastic preforms 10 are introduced into each of the blowing stations 2. It can also be seen that each blowing station 2 comprises at least one blow mould 21 and a stretching rod 22 for stretching the plastic preform 10. According to the invention, the apparatus 100 has, for adjusting the stretching speed V, an intrinsically closed control loop which includes a measuring device 4, wherein the measuring device 4 measures a wall thickness of the plastic container 10 and outputs these measured values to a closed-loop and/or open-loop control device 3. In order to adjust the wall thickness of the plastic bottles, therefore, this closed-loop and/or open-loop control device 3 controls the stretching speed V of the stretching rod 22 at least at times and/or at least in some locations during the blowing operation, individually for each blowing station 2, so that the respective stretching speed of the stretching rod 22 can be varied.

It can also be seen that, in a first phase, which may even be prior to the pre-blowing phase 300, the stretching rod 22 is run into the plastic preform 10 at a speed of at least 1.5 m/s and at most 2.5 m/s, for example at 2 m/s, essentially until the stretching rod 22 reaches the preform bottom. This time period may last at least 5 ms and at most 15 ms, for example 10 ms.

Thereafter, the stretching rod 22 may be at a standstill during a further blowing phase. This may last for a period of at least 30 ms and at most 70 ms, for example 50 ms. However, the stretching rod 22 need not necessarily be at a standstill but rather may also be slowed or accelerated.

During a subsequent blowing phase, the stretching rod 22 can then be run up to and thus moved at a predetermined speed of, for example, at least 1 m/s and at most 3 m/s, for example 1.8 m/s. This may take place for a time period of at least 40 ms and at most 80 ms, for example 60 ms. In particular, these blowing phases can be reflected in the individual time segments of FIG. 1.

There is thus provided in a simple manner an apparatus 100 and a method for producing plastic bottles in which a wall thickness distribution of the plastic preform or of the plastic bottle 20 can be adjusted in particular in an individual and inexpensive manner, in particular by means of a single control variable, that is to say by means of the stretching speed V of the stretching rod 22, without further control variables being mandatorily necessary in order to adjust such a wall thickness distribution.

The invention is not limited by the description based on the examples of embodiments. Rather, the invention encompasses any new feature and any combination of features in the claims, even if this feature in the combination itself is not explicitly indicated in the claims or in the examples of embodiments.

LIST OF REFERENCE SIGNS

L longitudinal direction
P transport path
p0 instant at which the stretching rod 22 strikes the inner bottom of the plastic preform
p10 instant at which the stretching rod 22 reaches the bottle inner bottom of the plastic bottle 20
pv, pi, pf instants of the pre-blowing phase, intermediate blowing phase and finish-blowing phase
V stretching speed
X stretching distance
2 blowing station
3 closed-loop and/or open-loop control device
4 measuring device
10 plastic preform
20 plastic bottle
21 blow mould
22 stretching rod
100 apparatus
100A first curve
100B second curve
200 blowing time
300 pre-blowing phase
400 intermediate blowing phase
500 finish-blowing phase
600 speed changeover time intervals

The invention claimed is:

1. A method for transforming plastic preforms into plastic bottles, wherein the plastic preforms are introduced into blowing stations, wherein each blowing station comprises at least one blow mould and a stretching rod for stretching the plastic preform along a longitudinal axis of the plastic preform within the blow mould, and the plastic preforms are expanded to form the plastic bottles by being acted upon by a gaseous medium in the blow mould,
wherein
a wall thickness of the plastic container is measured by at least one measuring device, and the measuring device outputs measured values representative of wall thickness to a closed-loop and/or open-loop control device, wherein at least a stretching speed of the stretching rod is varied by the closed-loop and/or open-loop control device at least at times and/or at least in some locations during the blowing operation, individually for each blowing station, in order to adjust a wall thickness of the plastic bottles.

2. The method according to claim 1,
wherein
the stretching speed is the sole control variable by which the wall thickness of the plastic bottles is adjusted via the closed-loop and/or open-loop control device during the blowing operation.

3. The method according to claim 1,
wherein
the blowing operation comprises the following steps:
pre-blowing by acting upon the plastic preforms with a first pressure,
intermediate blowing of the plastic preforms with a second pressure which is higher than the first pressure,
finish-blowing of the plastic preforms with a third pressure which is higher than the first two pressures,
and wherein
the stretching speed of the stretching rod is varied at least during the pre-blowing and/or during the intermediate blowing and/or the stretching speed of the stretching rod is varied at an instant.

4. The method according to claim 3,
wherein
the stretching speed of the stretching rod is slowed at the instant.

5. The method according to claim 3,
wherein
at least during the pre-blowing and/or during the intermediate blowing, the stretching speed is varied in such a way that the stretching speed is slowed or accelerated during the speed changeover time intervals.

6. The method according to claim 1,
wherein
during the finish-blowing, the stretching rod is at a standstill inside the blow mould or at least is slowed in terms of its speed.

7. The method according to claim 5,
wherein
during the speed changeover time intervals, the stretching speed changes linearly as a function of the blowing time.

8. The method according claim 1,
wherein
each blowing station comprises at least one drive unit, which is controlled individually by the closed-loop and/or open-loop control device in such a way that the stretching speed of the stretching rod is varied.

9. The method according to claim 1,
wherein
the finish-blowing of the plastic bottles is started in a time-controlled manner.

10. The method according to claim 1,
wherein
the blow moulds are transported along a predefined transport path during the expansion of the plastic preforms and the stretching speed is also selected as a function of a position of the blow moulds along this transport path.

11. The method according to claim 1, wherein the wall thickness of the plastic container is measured during the blowing operation.

12. The method according to claim 8, wherein the at least one drive unit comprises a servo motor.

* * * * *